(12) United States Patent
Nenonen et al.

(10) Patent No.: US 9,787,893 B1
(45) Date of Patent: Oct. 10, 2017

(54) ADAPTIVE OUTPUT CORRECTION FOR DIGITAL IMAGE CAPTURE PROCESSING

(71) Applicant: Microsoft Technology Licensing, LLC, Redmond, WA (US)

(72) Inventors: Petri Nenonen, Tampere (FI); Euan Barron, Tampere (FI); Jarkko Pekkarinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/096,213

(22) Filed: Apr. 11, 2016

(51) Int. Cl.
  *H04N 5/232* (2006.01)
  *H04N 5/225* (2006.01)
  *H04N 5/357* (2011.01)
  *H04N 9/04* (2006.01)
  *H04N 9/73* (2006.01)
  *H04N 1/00* (2006.01)
  *H04N 1/60* (2006.01)

(52) U.S. Cl.
  CPC ..... *H04N 5/23222* (2013.01); *H04N 1/00204* (2013.01); *H04N 1/6077* (2013.01); *H04N 5/2257* (2013.01); *H04N 5/23254* (2013.01); *H04N 5/3572* (2013.01); *H04N 9/045* (2013.01); *H04N 9/735* (2013.01)

(58) Field of Classification Search
  None
  See application file for complete search history.

(56) References Cited

U.S. PATENT DOCUMENTS

| 4,811,394 | A | * | 3/1989 | Ragavan | ........... H04L 25/03866 370/280 |
|---|---|---|---|---|---|
| 5,764,291 | A | | 6/1998 | Fullam | |
| 6,727,942 | B1 | | 4/2004 | Miyano | |
| 6,791,606 | B1 | | 9/2004 | Miyano | |
| 7,141,773 | B2 | | 11/2006 | Kaplan et al. | |
| 7,639,937 | B2 | | 12/2009 | Subbotin | |
| 7,800,783 | B2 | | 9/2010 | Wong et al. | |

(Continued)

FOREIGN PATENT DOCUMENTS

JP 2013013134 A 1/2013

OTHER PUBLICATIONS

Liang, et al., "Real-Time Scene Change Detection Assisted with Camera 3A: Auto Exposure, Auto White Balance, and Auto Focus", In Proceedings of SPIE, vol. 7871, Feb. 2, 2011, 1 page.

(Continued)

*Primary Examiner* — Mark T Monk

(57) ABSTRACT

In one example, digital image frames are accessed, each of the digital image frames having an associated control value for an automatic image capture processing function. A measure of information content change is determined for a current digital image frame relative to at least one previous digital image frame. A measure of information content reliability with respect to the automatic image capture processing function is determined for the current digital image frame. The control value associated with the current digital image frame is corrected based on the determined measure of information content change and the determined measure of information content reliability. A final control value for the automatic image capture processing function is output based on corrected control values for one or more digital image frames.

20 Claims, 13 Drawing Sheets

(56) References Cited

U.S. PATENT DOCUMENTS

| | | |
|---|---|---|
| 8,077,256 B1 | 12/2011 | Price et al. |
| 8,605,167 B2 | 12/2013 | Cote et al. |
| 8,922,707 B2 | 12/2014 | Kulkarni et al. |
| 9,041,864 B2 | 5/2015 | Nenonen |
| 2003/0052978 A1 | 3/2003 | Kehtarnavaz et al. |
| 2005/0122427 A1* | 6/2005 | Hougui ............... H04N 7/122 348/453 |
| 2006/0274975 A1 | 12/2006 | Kondo et al. |
| 2007/0047803 A1 | 3/2007 | Nikkanen |
| 2009/0278945 A1 | 11/2009 | Lin |
| 2016/0100148 A1 | 4/2016 | Paliy |

OTHER PUBLICATIONS

Kehtarnavaz, et al., "Real-Time Auto White Balancing Using DWT-Based Multi-Scale Clustering", In Proceedings of SPIE, vol. 6063, Feb. 15, 2006, 2 pages.

"International Search Report and Written Opinion Issued in PCT Application No. PCT/US17/025811", Dated: Jun. 26, 2017, 14 pages.

\* cited by examiner

ADAPTIVE OUTPUT CORRECTION FOR DIGITAL IMAGE CAPTURE PROCESSING

BACKGROUND

Digital cameras often allow automatic adjustment of various image capture parameters, such as automatic adjustment of white balance and automatic lens shading correction. However, scenes to be captured may not contain enough information that such automatic adjustments require in order to function properly. As a result, there may be instances when output correction is needed for automatic adjustments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, an apparatus comprises an access unit that is configured to access digital image frames captured by a digital camera. Each of the digital image frames has an associated control value for a predetermined automatic image capture processing function. The apparatus further comprises an information content change analysis unit that is configured to determine a measure of information content change for a current digital image frame of the accessed digital image frames relative to at least one previous digital image frame of the accessed digital image frames. The apparatus further comprises an information content reliability analysis unit that is configured to determine a measure of information content reliability with respect to the predetermined automatic image capture processing function for the current digital image frame of the accessed digital image frames. The apparatus further comprises a correction unit that is configured to correct the control value associated with the current digital image frame of the accessed digital image frames based on the determined measure of information content change and the determined measure of information content reliability. The apparatus further comprises an output unit that is configured to output a final control value for the predetermined automatic image capture processing function based on corrected control values for one or more digital image frames of the accessed digital image frames.

In another example, a camera module and a method have been discussed along with the features of the apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of present examples and is not intended to represent the only forms in which the present examples may be constructed or utilized. The description sets forth functions of the examples and a sequence of steps for constructing and operating the examples. However, the same or equivalent functions and sequences may be accomplished by different examples.

At least some of the disclosed examples may allow output correction for digital image capture processing that adapts to the information content of captured digital image frames. At least some of the disclosed examples may increase accuracy of the digital image capture processing. At least some of the disclosed examples may conserve power in digital image capture processing. At least some of the disclosed examples may reduce processor load in digital image capture processing.

Figure 1:
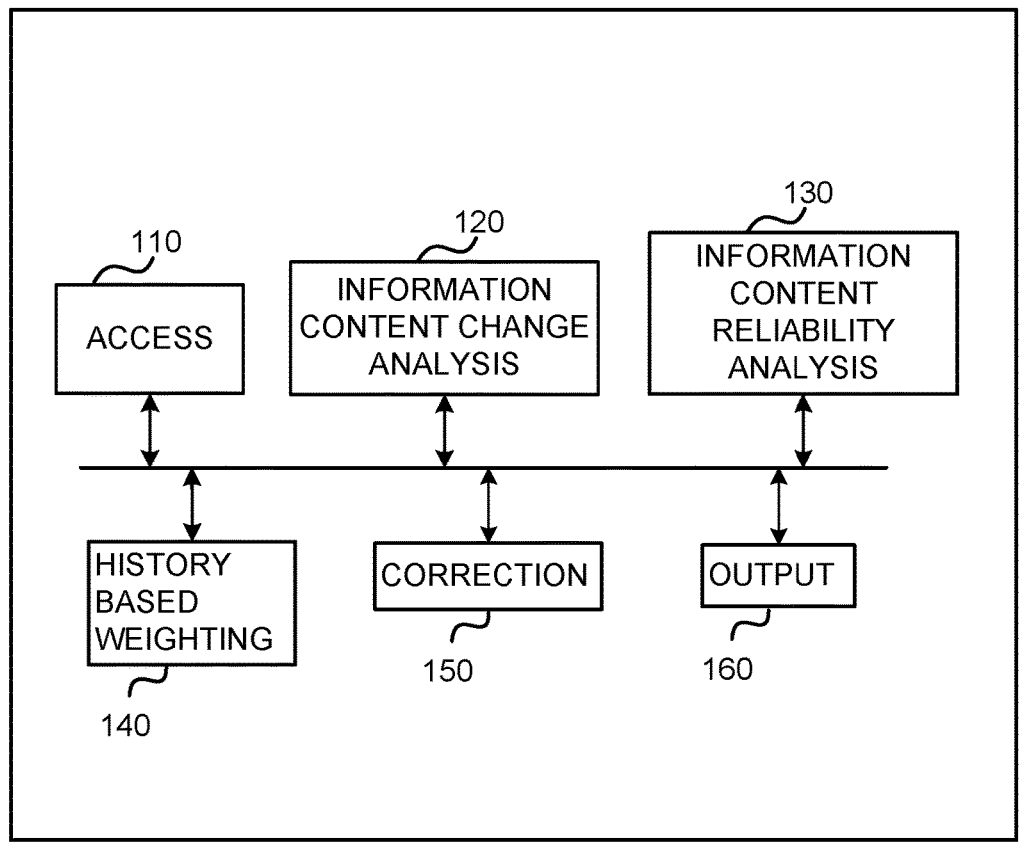
FIG. 1 is an example block diagram of an apparatus in accordance with an example embodiment.

FIG. 1 illustrates an apparatus 100 in accordance with an example embodiment. The apparatus 100 may be employed, for example, in the camera module 200 of FIG. 2 which in turn may be employed, for example, in the electronic device 400 of FIG. 4. However, it should be noted that the apparatus 100 may also be employed on a variety of other devices and apparatuses, and therefore, embodiments should not be limited to application on devices and apparatuses such as the electronic device 400 of FIG. 4. Furthermore, it should be noted that at least some of the elements described below may not be mandatory and thus some may be omitted in certain embodiments. The apparatus 100 may be implemented e.g. as a part of an image signal processor (ISP) which may in turn be implemented as a part of a system on a chip (SoC).

The apparatus 100 comprises an access unit 110 that is configured to access digital image frames captured by a digital camera. Each of the digital image frames has an associated control value for a predetermined automatic image capture processing function. The automatic image capture processing function may comprise e.g. an illuminant dependent color correction function or an illuminant dependent color space transformation function. For example, the automatic image capture processing function may comprise an automatic white balance (AWB) function or a lens shading correction function. In another example, the automatic image capture processing function may comprise noise reduction that automatically adapts its strength but can perform effective analysis only on images which have flat surfaces, i.e. not too much texture. The automatic image capture processing function may be performed during pixel processing of the digital image frames. Accordingly, at least some of the disclosed examples may allow giving more weight to time instances when there are flat surfaces available.

White balance is an image processing and photography term that refers to adjustment of the intensities of colors, e.g. red, green and blue in order to render neutral (e.g. gray and/or white) colors correctly. Today, most digital cameras implement an algorithm that attempts to perform automatic white balancing. Typically, an automatic white balance function or algorithm tries to estimate the ambient illumination from the camera data and then use this information to transform the image data.

Lens shading correction tries to correct shading effects caused e.g. by the optical lens arrangement of a camera. One such shading effect is that the image is brighter in the center and decreases in brightness at the edges of the pixel array of the image sensor. Other examples of lens shading effects include color variations across the image, e.g. corners may be greener than the center. If uncorrected, such shading effects may result in undesirable variations in intensity or color across an image that may be discernable to an end user. Lens shading correction algorithms or functions are used to correct these shading effects. Empirical data is used to determine coefficients of a gain correction function that is used to adjust the gain of individual pixels to compensate for the lens shading.

Herein, the term control value refers to a value or a parameter that the automatic image capture processing function utilizes to adjust image content in order to achieve its objective. In practice, an automatic image capture processing function may utilize more than one control values. However, only one control value is used in the following examples and figures for the sake of clarity. Examples of control values include, but are not limited to, gains for each color channel (e.g. red (R), green (G) and blue (B)) used e.g. by automatic white balancing, and spatially varying gains for the color channels used e.g. by the lens shading correction. Alternatively or in addition, at least some of the disclosed examples may allow processing a group of control values (such as R, G and B gains) with the same weighting.

The apparatus 100 further comprises an information content change analysis unit 120 that is configured to determine a measure of information content change for a current digital image frame of the accessed digital image frames relative to at least one previous digital image frame of the accessed digital image frames. The information content change analysis unit 120 may be further configured to assign an information content change weight to the current digital image frame based on the determined measure of information content change for the current digital image frame such that the greater the determined measure of information content change is the greater the assigned information content change weight is. The information content change analysis unit 120 may be further configured to perform the determination of the measure of information content change for the current digital image frame by comparing the information content of the current digital image frame with the information content of the at least one previous digital image frame. Alternatively or in addition, the information content change analysis unit 120 may be further configured to perform the determination of the measure of information content change for the current digital image frame based on detected motion of the digital camera. The motion detection may utilize a motion detection sensor, such as a gyroscope or the like. Alternatively or in addition, scene based motion vectors may be utilized. Alternatively or in addition, differences in the results or control values given by the automatic image capture processing function may be utilized by the information content change analysis unit 120. Alternatively or in addition, differences in internal parameters between current and previous image frames may be utilized by the information content change analysis unit 120.

Figure 6:
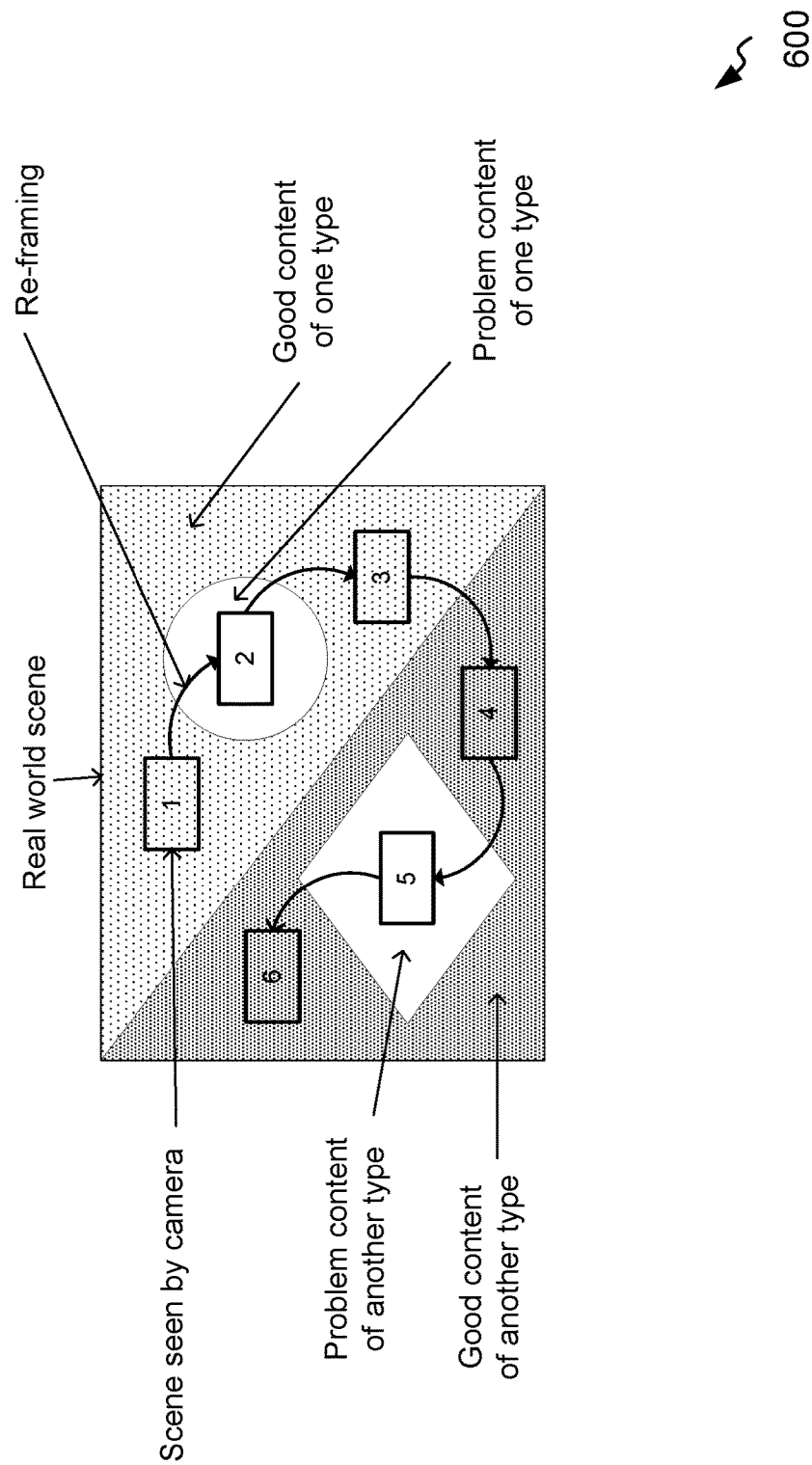
FIG. 6 illustrates framing differences.

FIG. 6, described further herein, illustrates how the information content of successive digital image frames may vary due to e.g. camera movement. In diagram 600, framing 1 represents a first field of view of the digital camera (and correspondingly the information content of the first digital image frame). Then, the user moves the camera several times to framing 2, to framing 3, to framing 4, to framing 5, and finally to framing 6. The information content of successive digital image frames may also vary due to e.g. movement in the real world scene. The information content change analysis unit 120 is configured to detect these changes in framing and/or image content and measure their magnitude.

Each digital image frame has content that the automatic image capture processing function tries to analyze in order to determine its control value for the digital image frame. The suitability of the image content for the automatic image capture processing function may vary from non-suitable or problematic to suitable or good. For example, automatic white balancing tries to estimate the illuminant color based on the color reflected from the surfaces of the objects in the scene. However, the surface colors may distort the illuminant color and therefore the surface color may be falsely detected to be the illuminant color. In a case of a close up picture of a red object on a table of wooden color the reflected spectrum is biased towards red and yellow wavelengths. In this case, AWB algorithms often output incorrect results estimating the illumination to be too yellow as a result of which the final white balance corrected image appears to be too blue. Another example is a portrait scene in which most of the reflecting surface is skin colored twisting the final white balance corrected image towards the opposite color resulting in pictures with skin color appearing gray or too blue. In the example of FIG. 6, framings 2 and 5 represent non-suitable or problematic content, and framings 1, 3, 4 and 6 represent suitable or good content.

The apparatus 100 further comprises an information content reliability analysis unit 130 that is configured to determine a measure of information content reliability with respect to the predetermined automatic image capture processing function for the current digital image frame of the accessed digital image frames. The information content reliability analysis unit 130 may be further configured to assign an information content reliability weight to the current digital image frame based on the determined measure of information content reliability for the current digital image frame such that the greater the determined measure of information content reliability is the greater the assigned information content reliability weight is.

The measure of information content reliability may indicate the likelihood of the correctness of the digital image frame associated control value with respect to the predetermined automatic image capture processing function. The measure of information content reliability may be based on statistical information. For example, in the case of AWB, statistical information about the range of possible or most probable illuminant colors may be utilized to determine the likelihood of a given color in the image frame being due to a real illuminant (as opposed to being due to a reflecting surface color of an object in the image frame). In another example, machine learning may be utilized to provide information on which the measure of information content reliability will be based.

In an example, in the case automatic image capture processing function being AWB, when there is characteristic data regarding the response of an image sensor for different illuminant color temperatures, a deviance may be calculated between the characteristic data at a defined color temperature and average values of the respective color elements in an image block. It may then be judged that the block is likely to be grey when the deviance is less than a predetermined value. In other words, if the result differs too much from the possible whites as the image sensor in use sees those, the measure of information content reliability may be low.

In another AWB related example, an image frame may be divided into regions, an average chromaticity for each region may be calculated, and the calculated chromaticity for each region may be compared with chromaticity data of plausible illuminants. In other words, an average color point for a given captured scene may be calculated and compared against the average color points for each of the plausible illuminants.

In another AWB related example, the measure of information content reliability includes a measure of how well a gray world assumption is fulfilled. The gray world assumption provides that, given an image with sufficient amount of color variations, the average value of the red, green and blue components of the image should average out to a common gray value. In a given real world scene, there are often lots of different color variations. Since the variations in color are typically random and independent, the average color point should tend to converge to the mean value, which is gray. If there are not many color variations in the scene, the assumption may not be fulfilled.

In another AWB related example, AWB utilizes color histogram coincidence as a basic criterion. When the overlap area of a color histogram reaches the maximum, the respective gain coefficients of color channels are derived to achieve white balance. Here, the measure of information content reliability may include a measure of how much there is coincidence or how similar relative shapes the histograms have. If the coincidence is hard to find, then the measure of information content reliability may be low.

In a vignetting related lens shading correction example, vignetting correction control values are computed, such that large image regions appropriate for vignetting function estimation are identified, and spatial variations in segmentation scale are used in a manner that enhances collection of reliable vignetting data. Here, the measure of information content reliability may include a measure of how well this algorithm was able to find the reliable vignetting data. Similar approaches may be applied to color variations related lens shading effects.

In other words, the automatic image capture processing function may have one or more assumptions concerning the scene to be captured or the captured image, and the measure of information content reliability may be a measure of how well these assumptions are fulfilled.

The apparatus 100 may further comprise a history based weighting unit 140 that is configured to assign a history based weight to the current digital image frame of the accessed digital image frames such that the current digital image frame of the accessed digital image frames is assigned a larger history based weight than all the previous digital image frames of the accessed digital image frames.

The apparatus 100 further comprises a correction unit 150 that is configured to correct the control value associated with the current digital image frame of the accessed digital image frames based on the determined measure of information content change and the determined measure of information content reliability. The correction unit 150 may be configured to perform the correction of the control value associated with the current digital image frame based on the determined measure of information content change by applying the information content change weight assigned to the current digital image frame to the control value associated with the current digital image frame. The correction unit 150 may be further configured to perform the correction of the control value associated with the current digital image frame based on the determined measure of information content reliability by applying the information content reliability weight assigned to the current digital image frame to the control value associated with the current digital image frame. The correction unit 150 may be further configured to perform the correction of the control value associated with the current digital image frame by applying the history based weight assigned to the current digital image frame to the control value associated with the current digital image frame.

The apparatus 100 further comprises an output unit 160 that is configured to output a final control value for the predetermined automatic image capture processing function based on corrected control values for one or more digital image frames of the accessed digital image frames. The output unit 160 may be configured to determine the final control value to be output by calculating a weighted average of the corrected control values for one or more digital image frames of the accessed digital image frames.

Optionally, the apparatus 100 may be configured to utilize temporal smoothing (e.g. averaging) of the control values to eliminate or reduce occasional wrong results.

At least some of the access unit 110, the information content change analysis unit 120, the information content reliability analysis unit 130, the history based weighting unit 140, the correction unit 150, and the output unit 160 may be implemented e.g. in an image signal processor and/or a system-on-a-chip, or as a part of an image signal processor and/or a system-on-a-chip.

Figure 5A:
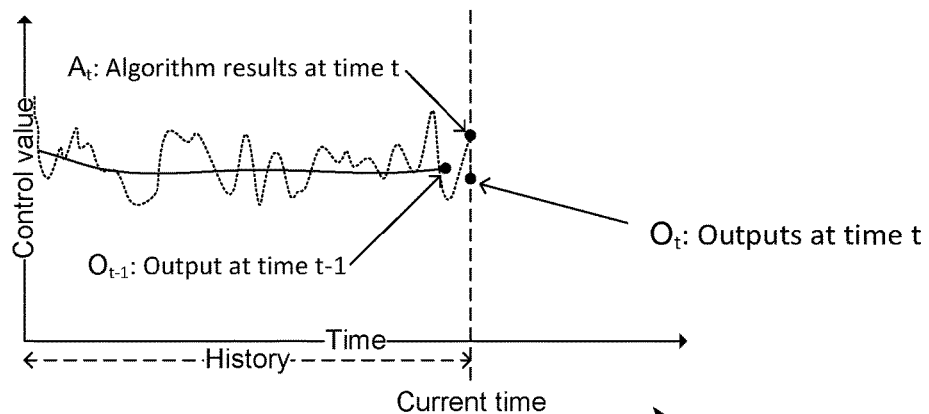
FIGS. 5A and 5B are example diagrams illustrating use of buffering.

An example of the control value of a given automatic image capture processing function is illustrated with diagram 510 in FIG. 5A. Here, the horizontal axis represents time and the vertical axis represents the control value. Accordingly, $A_t$ represents the control value (produced by the automatic image capture processing function or algorithm) at the instance of time t. $A_t$ may also include internal values or parameters of the automatic image capture processing function or algorithm, such as differences in internal parameters between current and previous image frames as discussed above. Furthermore, $A_t$ may represent a group of control values. Current time represents the instance of processing a current digital image frame of the accessed digital image frames. History represents the instances of processing the previous digital image frames of the accessed digital image frames. $w_t$ represent a weight at the instance of time t used in an embodiment. $w_t$ may be a combination of weights, such as a combination of the information content change weight and the information content reliability weight. The value of $w_t$ at each instance of time t is based on the information content of the digital image frame being processed or analyzed at that instance of time. In an embodiment, $w_t$ may vary between from 0 to 1. $O_t$ represents output from the correction unit 150 at the instance of time t, i.e. the corrected control value at the instance of time t. Here, the final control value output by the output unit 160 is a combination or accumulation of values of $O_t$. In the example of FIG. 5A:

$$O_t = w_t * A_t + (1-w_t) * O_{t-1}.$$

In other words, the example of FIG. 5A utilizes a buffering method storing the preceding output value (i.e. $O_{t-1}$) to calculate the final control value.

Figure 5B:
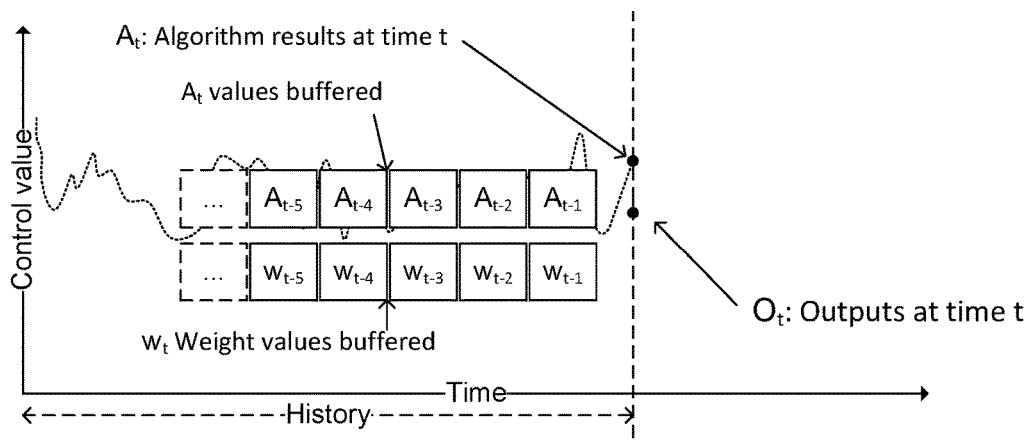
Figure 5B:
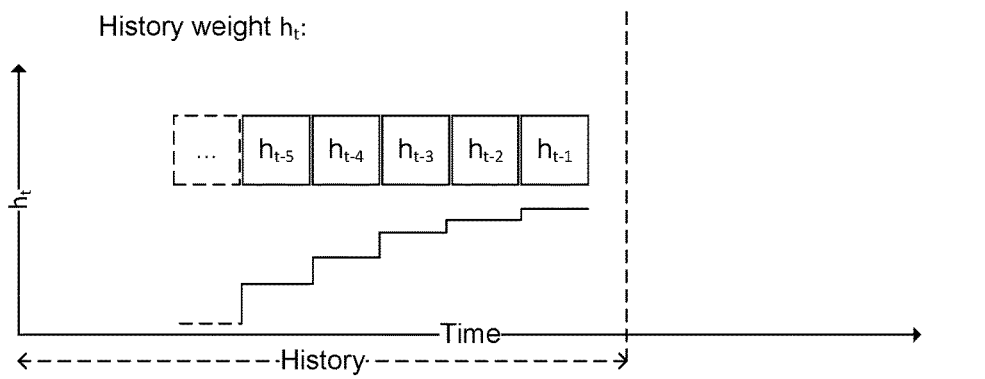

In another embodiment, a buffering method may be used that stores more than one previous output value (or the corresponding previous control values $A_t$ and the respective weights) to calculate the final control value. Diagram 521 in FIG. 5B illustrates one such embodiment. Here:

$$O_t = \sum_{n=0}^{m} h_{t-n} * w_{t-n} * A_{t-n}.$$

$h_t$ (diagram 522) represent the history based weight that is used to weigh more recent values differently than older values, as discussed above. $h_t$ may also be buffered, as shown in FIG. 5B.

Figure 7:
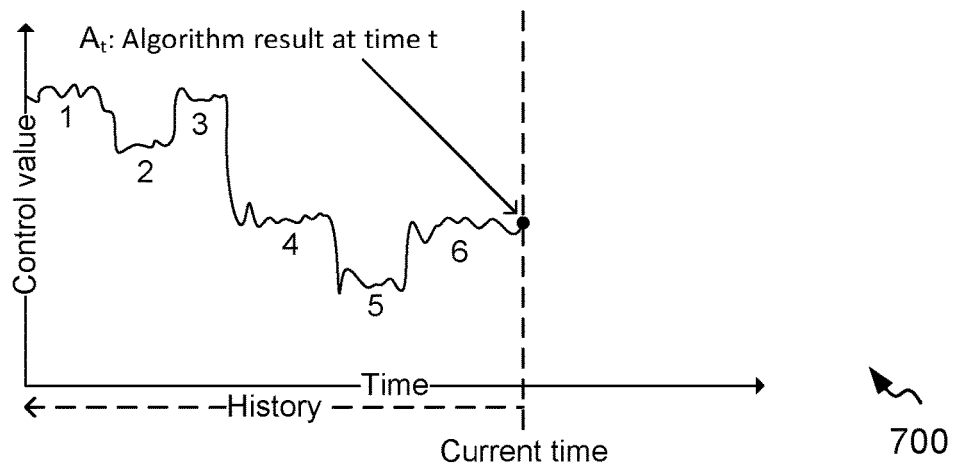
FIG. 7 is an example diagram illustrating results given by an automatic image capture processing function.

Diagram 700 in FIG. 7 illustrates an example of the control value of a given automatic image capture processing function related to the framings 1-6 in FIG. 6. FIGS. 8A to 8D illustrate examples of the various weights provided by the information content change analysis unit 120 and the information content reliability analysis unit 130. Again, numerals 1-6 correspond to the framings 1-6 in FIG. 6.

Figure 8A:
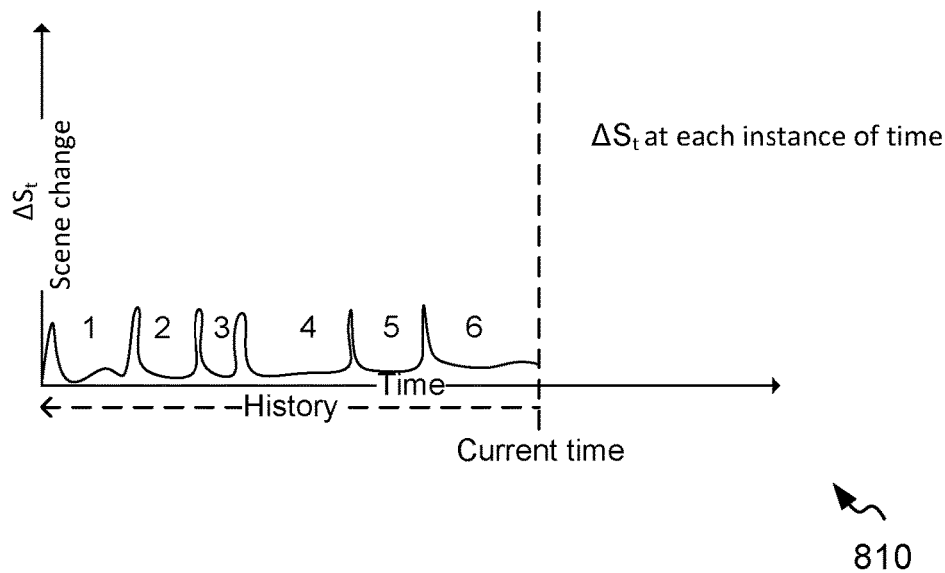
FIGS. 8A-8D are example diagrams illustrating weight calculations.
Figure 8B:
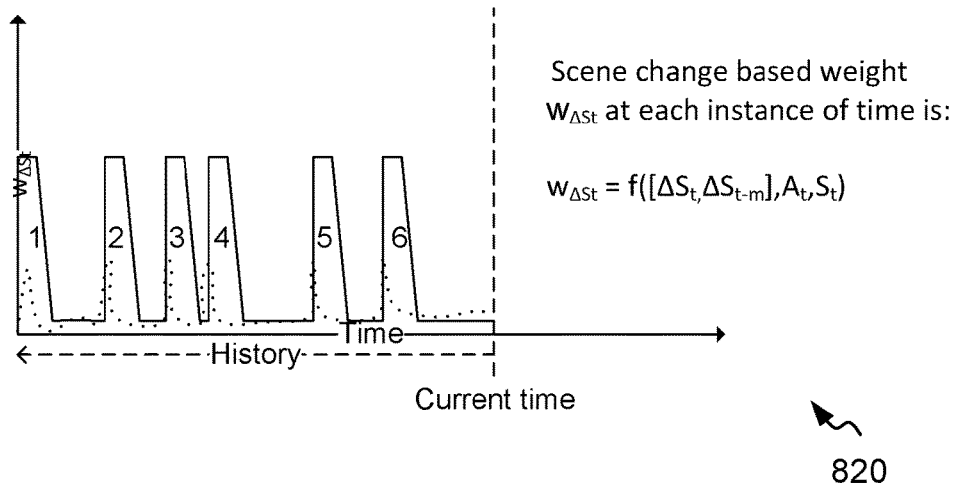

Diagram 810 in FIG. 8A illustrates the measure $\Delta S_t$ of information content change (or scene change) $S_t$ at the instance of time t that may be determined by the information content change analysis unit 120. As can be seen, the change from one framing to another causes a peak in $\Delta S_t$. Diagram 820 in FIG. 8B illustrates a corresponding information content change weight $w_{\Delta S_t}$ at the instance of time t that may be assigned by the information content change analysis unit 120. Here:

$$w_{\Delta S_t} = f([\Delta S_t, \Delta S_{t-m}], A_t, S_t).$$

Herein, notation $[\Delta S_t, \Delta S_{t-m}]$ indicates all values of $\Delta S$ between t and t-m, i.e. values $\Delta S_t$, $\Delta S_{t-1}$, $\Delta S_{t-2}$, $\Delta S_{t-3}$, ..., $\Delta S_{t-(m-1)}$, $\Delta S_{t-m}$. In some embodiments, $A_t$ and/or $S_t$ may be left out.

Figure 8C:
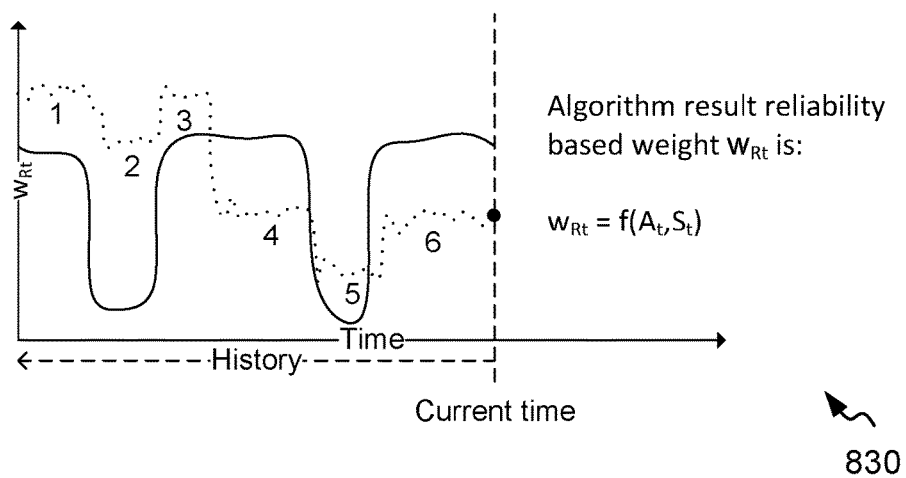

Diagram 830 in FIG. 8C illustrates a corresponding information content reliability (or algorithm result reliability) weight $w_{R_t}$ at the instance of time t that may be assigned by the information content reliability analysis unit 130 based on the measure of information content reliability $R_t$ determined by the information content reliability analysis unit 130. Here:

$$w_{R_t} = f(A_t, S_t).$$

As can be seen, $w_{R_t}$ is low when the information content reliability is determined to be low, and $w_{R_t}$ is high (e.g. close or equal to 1) when the information content reliability is determined to be high.

Figure 8D:
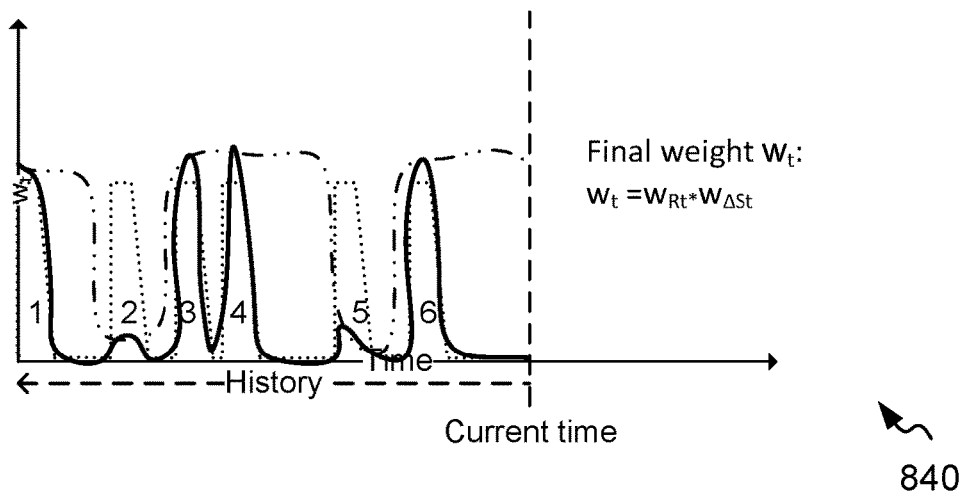

Diagram 840 in FIG. 8D illustrates a corresponding combined weight $w_t$ at the instance of time t that may be utilized by the correction unit 150. Here:

$$w_t = w_{R_t} * w_{\Delta S_t}.$$

As can be seen, values of weight $w_t$ at the instances of time t corresponding to the framings 2 and 5 of FIG. 6 are lower than those of the framings 1, 3, 4 and 6.

Figure 9A:
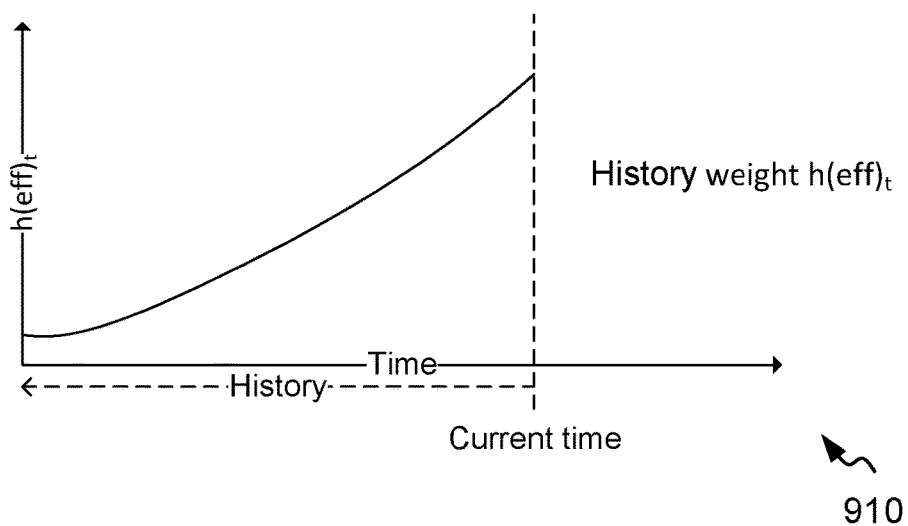
FIGS. 9A-9C are example diagrams illustrating history based weighting.
Figure 9B:
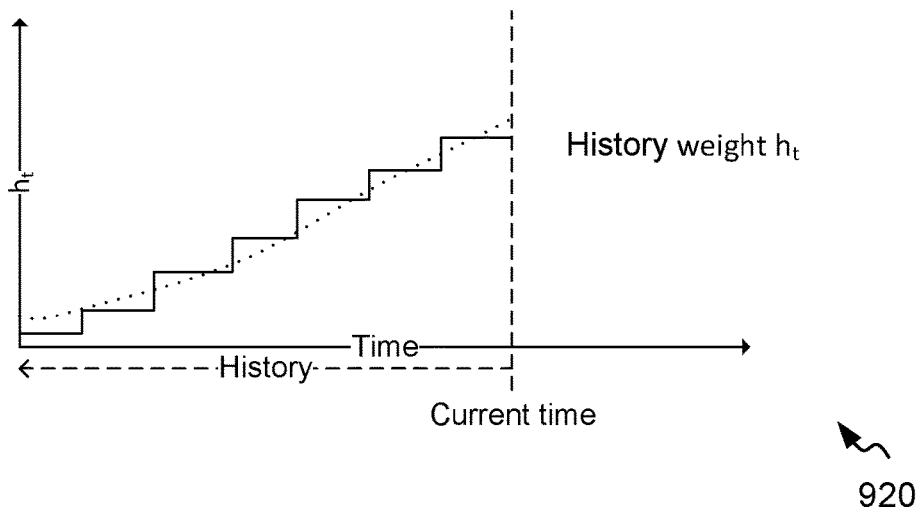
Figure 9C:
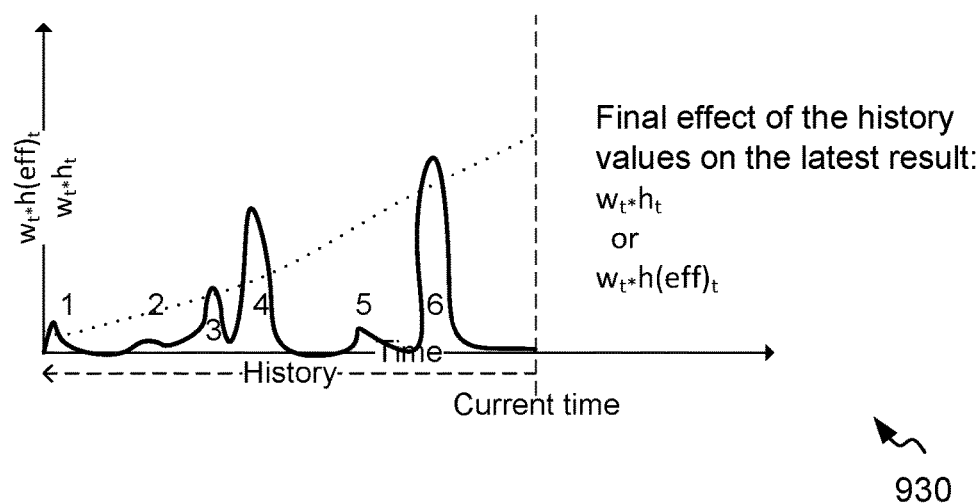

FIGS. 9A to 9C illustrate examples of the weight provided by the history based weighting unit 140. Diagram 910 in FIG. 9A illustrates a history based weight $h(eff)_t$ at the instances of time t. The history based weight $h(eff)_t$ may be used e.g. with the buffering method of FIG. 5A so that newer values have automatically more effect on the final result. Diagram 920 in FIG. 9B illustrates another history based weight $h_t$ at the instances of time t. The history based weight $h_t$ may be used e.g. with the buffering method of FIG. 5B.

Diagram 930 in FIG. 9C illustrates the effect of the history based weight on the combined weight $w_t$. Here the total weight is:

$$w_t * h_t$$

or $$w_t * h(eff)_t.$$

As can be seen, the use of a history based weight allows the latest good image content to have the largest effect.

Figure 10:
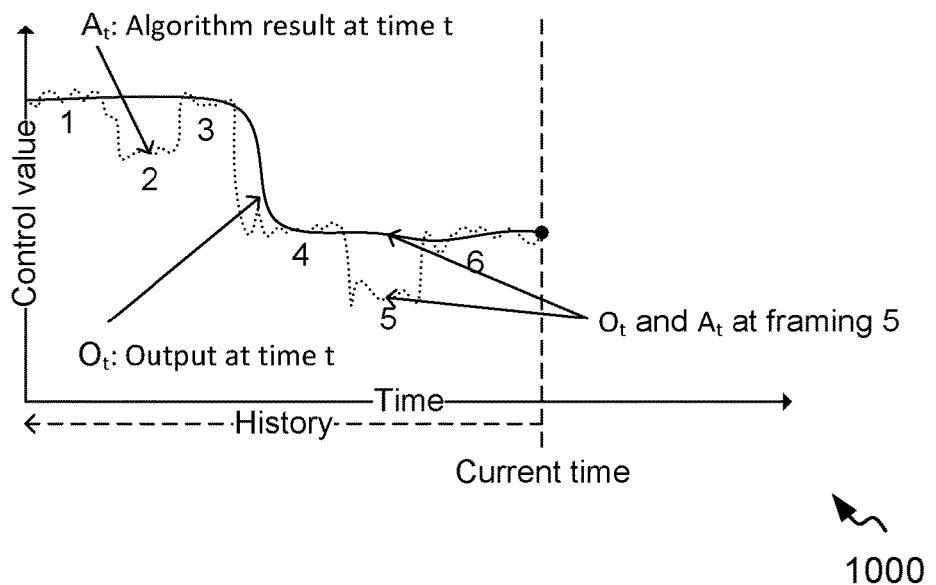
FIG. 10 is an example diagram illustrating a control value corrected by applying weights.

Diagram 1000 in FIG. 10 illustrates the corrected control value $O_t$ that may be output from the correction unit 150 at the instance of time t, i.e. the corrected control value at the instance of time t. As can be seen, the corrected control value $O_t$ is more optimal than the original control value $A_t$ at the instances of time t corresponding to the framing 5, for example.

Figure 11:
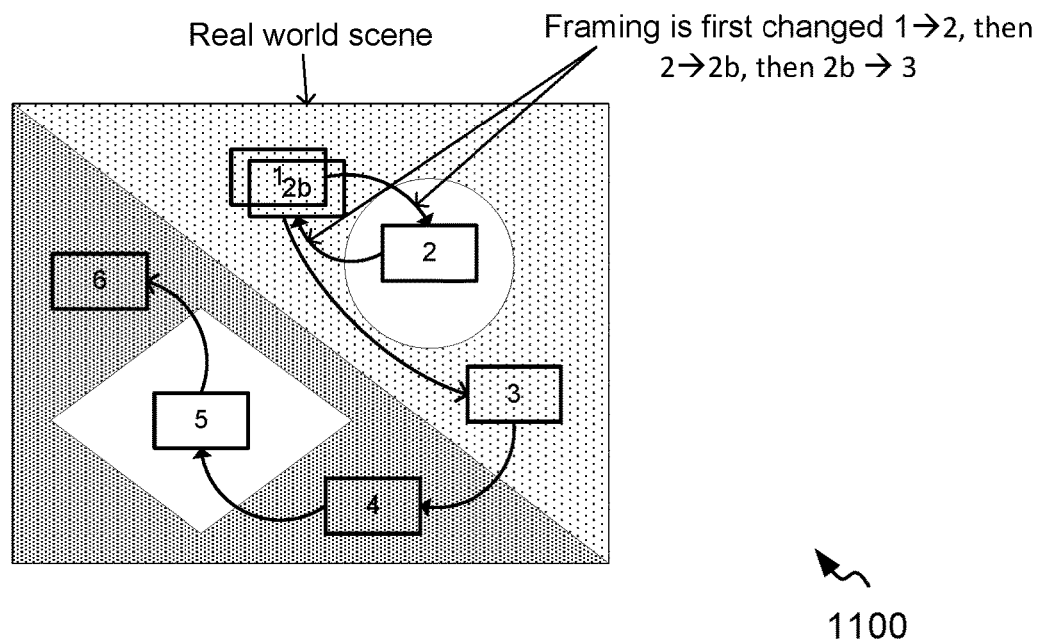
FIG. 11 illustrates use of motion tracking.

Diagram 1100 in FIG. 11 illustrates use of motion tracking to assist in making the information content or scene change based weighting more accurate. Here, framing is first changed from 1 to 2, then from 2 to 2b, then from 2b to 3, and then from 3 to 4, from 4 to 5, and finally from 5 to 6. Here, framing 2b is substantially the same as framing 1. Motion tracking may be used to learn that framing 2b is substantially the same as the previous framing 1, thereby allowing the information content or scene change based weight for framing 2b and/or framing 1 to be reduced so that its content affects the final result only once.

Figure 12:
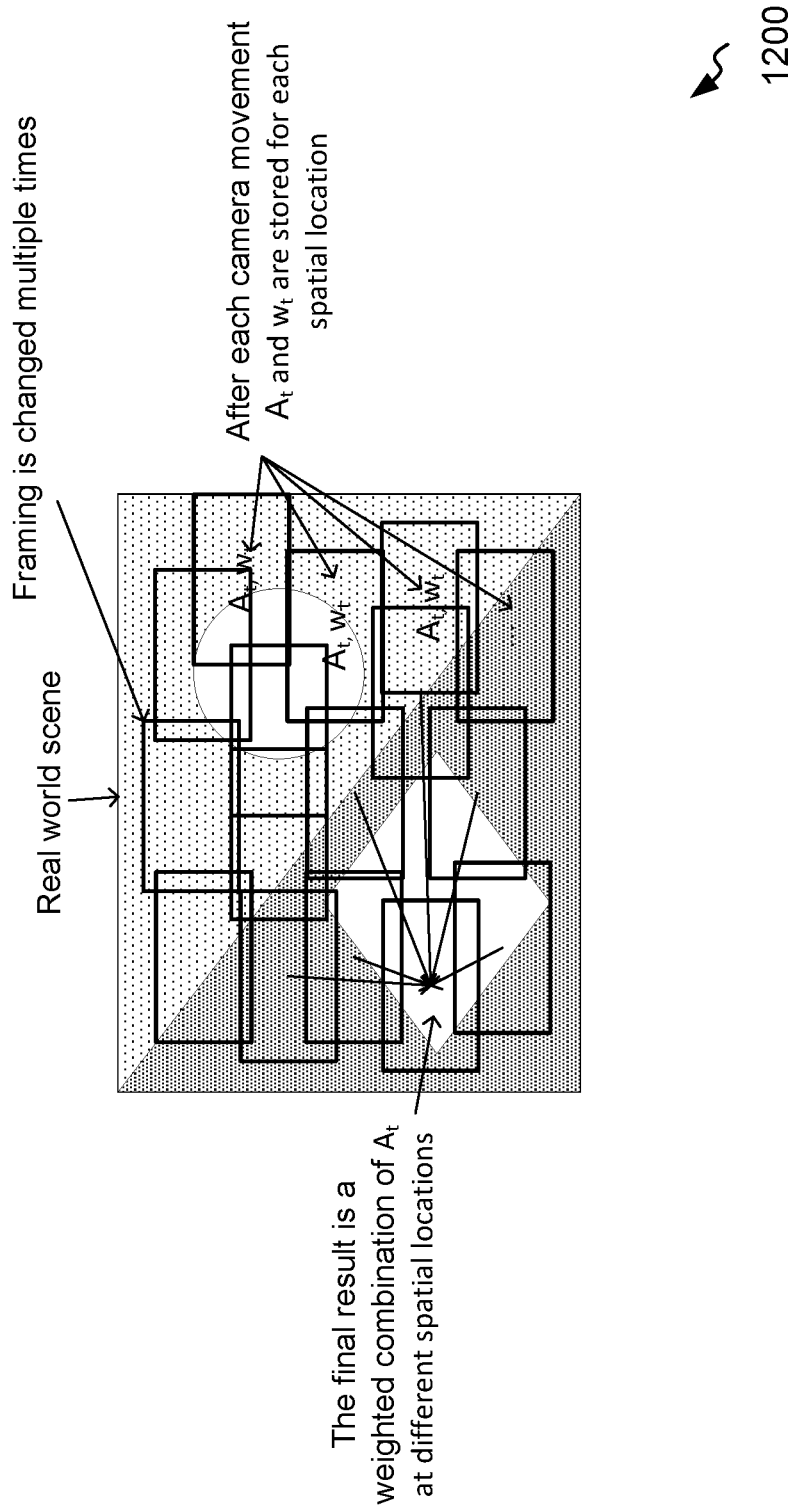
FIG. 12 illustrates scene re-construction.

Diagram 1200 in FIG. 12 illustrates re-construction of a wider scene before weighting the areas spatially. Here, framing is changed multiple times so that a large proportion of the real world scene is covered by a union of the different framings. After each camera movement, $A_t$ and $w_t$ are stored for each spatial location. In addition, $S_t$ may also be stored. When e.g. the final capture is made, the final result is a weighted combination of $A_t$ at different spatial locations. Spatial weighting may be added so that locations relevant to the final capture location are weighted more than other locations.

Figure 13:
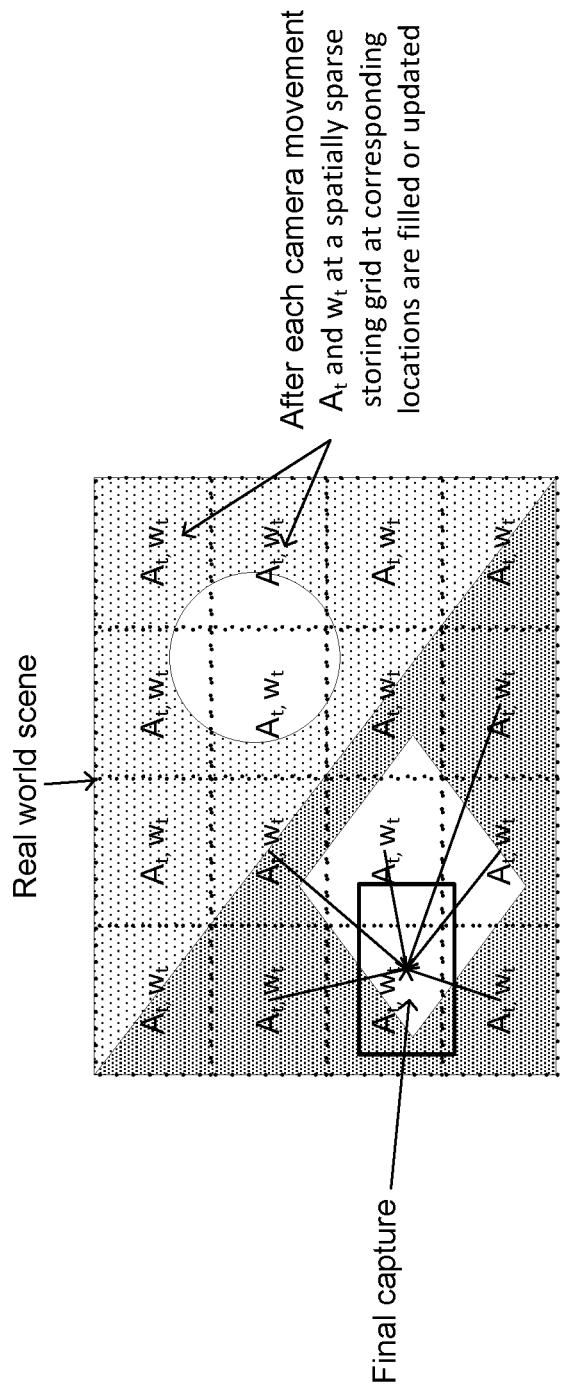
FIG. 13 illustrates buffering.

Diagram 1300 in FIG. 13 illustrates a buffer that may be used for the re-construction of FIG. 12. After each camera movement $A_t$ and $w_t$ are filled or updated at corresponding locations at a spatially sparse storing grid, thereby allowing saving memory.

Figure 2:
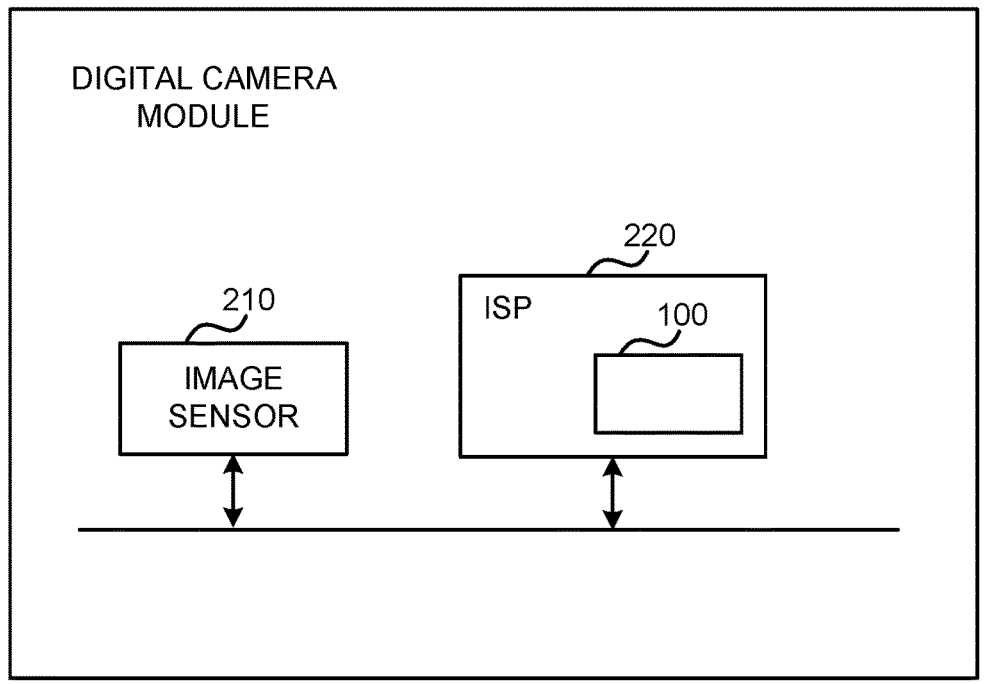
FIG. 2 is an example block diagram of a camera module in accordance with an example embodiment.

FIG. 2 illustrates a camera module 200 in accordance with an example embodiment. The camera module 200 may be employed, for example, in the electronic device 400 of FIG. 4. However, it should be noted that the camera module 200 may also be employed on a variety of other devices and apparatuses, and therefore, embodiments should not be limited to application on devices and apparatuses such as the electronic device 400 of FIG. 4. Furthermore, it should be noted that at least some of the elements described below may not be mandatory and thus some may be omitted in certain embodiments.

The camera module 200 of FIG. 2 comprises an image sensor 210 that is configured to capture digital image frames.

The image sensor 210 may include e.g. a charge-coupled device (CCD) sensor or a complementary metal-oxide-semiconductor (CMOS) sensor. The camera module 200 may further comprise an optical system including a lens arrangement (not shown in FIG. 2).

The camera module 200 further comprises the apparatus 100 of FIG. 1. The apparatus 100 comprises the access unit 110, the information content change analysis unit 120, the information content reliability analysis unit 130, the correction unit 150 and the output unit 160. The apparatus 100 may further comprise the history based weighting unit 140. The camera module 200 may comprise an image signal processor 220 which may include the apparatus 100. The ISP 220 may be implemented as a part of a system on a chip (not shown in FIG. 2).

In the example of FIG. 2, the functionalities and properties of the access unit 110, the information content change analysis unit 120, the information content reliability analysis unit 130, the history based weighting unit 140, the correction unit 150, and the output unit 160 are substantially similar to those of their counterparts in the example of FIG. 1, so their descriptions are not repeated here in detail.

Figure 3:
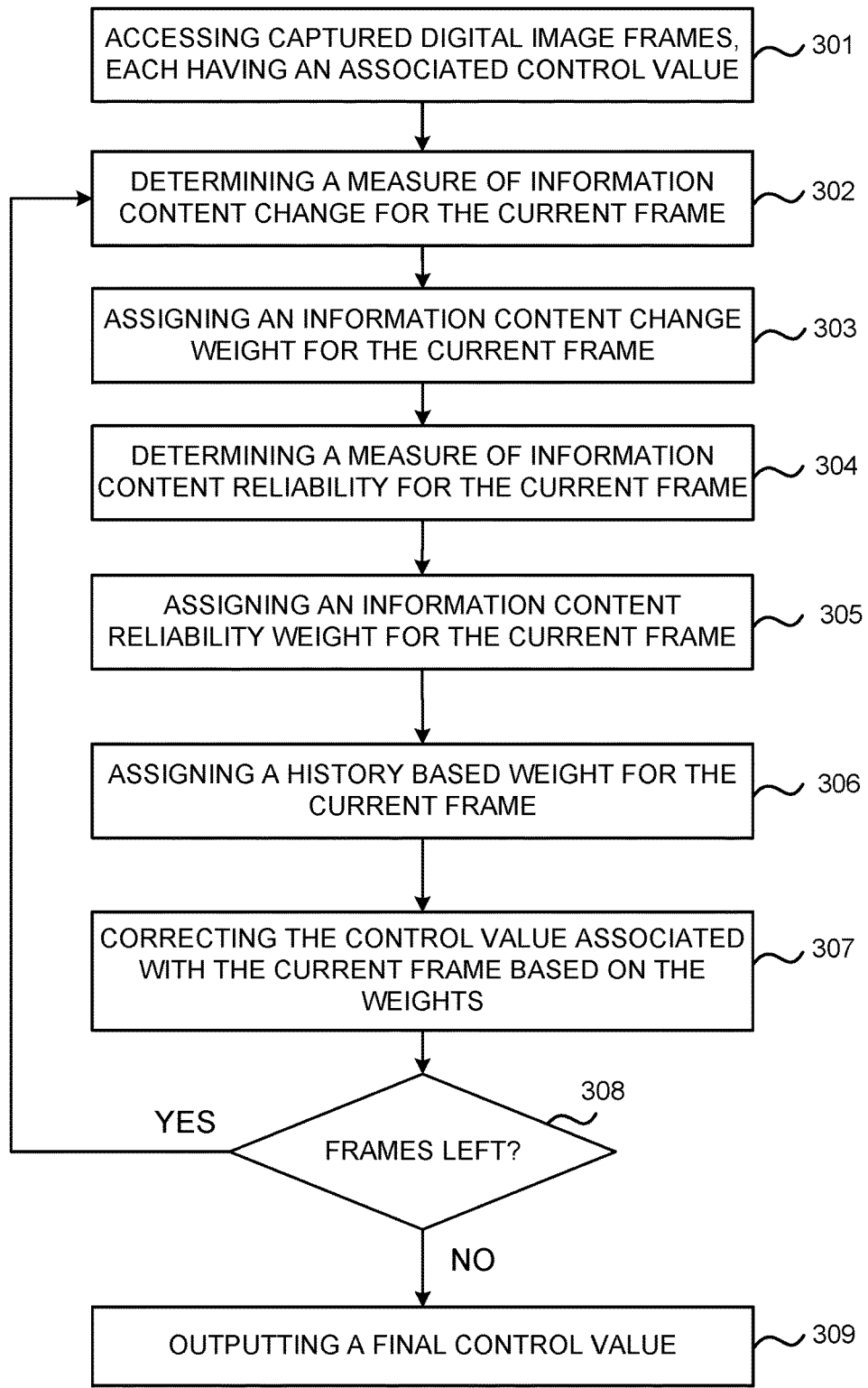
FIG. 3 is an example flow diagram of a method in accordance with an example embodiment.

FIG. 3 is an example flow diagram of a method 300 in accordance with an example embodiment. At operation 301, digital image frames captured by a digital camera are accessed. Each of the digital image frames has an associated control value for a predetermined automatic image capture processing function.

At operation 302, a measure of information content change is determined for a current digital image frame of the accessed digital image frames relative to at least one previous digital image frame of the accessed digital image frames. At operation 303, an information content change weight is assigned to the current digital image frame based on the determined measure of information content change for the current digital image frame such that the greater the determined measure of information content change is the greater the assigned information content change weight is. The determination of the measure of information content change for the current digital image frame may be performed based on any combination of the following: a comparison the information content of the current digital image frame with the information content of the at least one previous digital image frame, and detected motion of the digital camera.

At operation 304, a measure of information content reliability with respect to the predetermined automatic image capture processing function is determined for the current digital image frame of the accessed digital image frames. The measure of information content reliability indicates the likelihood of the correctness of the digital image frame associated control value with respect to the predetermined automatic image capture processing function. At operation 305, an information content reliability weight is assigned to the current digital image frame based on the determined measure of information content reliability for the current digital image frame such that the greater the determined measure of information content reliability is the greater the assigned information content reliability weight is.

At operation 306, a history based weight is assigned to the current digital image frame of the accessed digital image frames such that the current digital image frame of the accessed digital image frames is assigned a larger history based weight than all the previous digital image frames of the accessed digital image frames.

At operation 307, the control value associated with the current digital image frame of the accessed digital image frames is corrected based on the determined measure of information content change and the determined measure of information content reliability. The correction of the control value associated with the current digital image frame based on the determined measure of information content change may be performed by applying the information content change weight assigned to the current digital image frame to the control value associated with the current digital image frame. Furthermore, the correction of the control value associated with the current digital image frame based on the determined measure of information content reliability may be performed by applying the information content reliability weight assigned to the current digital image frame to the control value associated with the current digital image frame. Furthermore, the correction of the control value associated with the current digital image frame may be performed by also applying the history based weight assigned to the current digital image frame to the control value associated with the current digital image frame.

At operation 308, the method determines whether the current digital image frame is the last digital image frame of the accessed digital image frames. If there still is at least one digital image frame left unprocessed, the method returns to operation 302 and starts to operate on the next digital image frame of the accessed digital image frames. Otherwise, the method proceeds to operation 309. In an embodiment, the method may proceed to operation 309 each time there is a need to output a corrected control value, e.g. for each frame in a video frame sequence in addition to a final still image.

At operation 309, a final control value for the predetermined automatic image capture processing function is output based on corrected control values for one or more digital image frames of the accessed digital image frames.

Operation 301 may be performed by the access unit 110 of FIG. 1. Operations 302 and 303 may be performed by the information content change analysis unit 120 of FIG. 1. Operations 304 and 305 may be performed by the information content reliability analysis unit 130 of FIG. 1. Operation 306 may be performed by the history based weighting unit 140 of FIG. 1. Operations 307 and 308 may be performed by the correction unit 150 of FIG. 1. Operation 309 may be performed by the output unit 160 of FIG. 1.

At least some of the operations 301-309 may be skipped when the total weight is 0, thereby allowing saving power.

Figure 4:
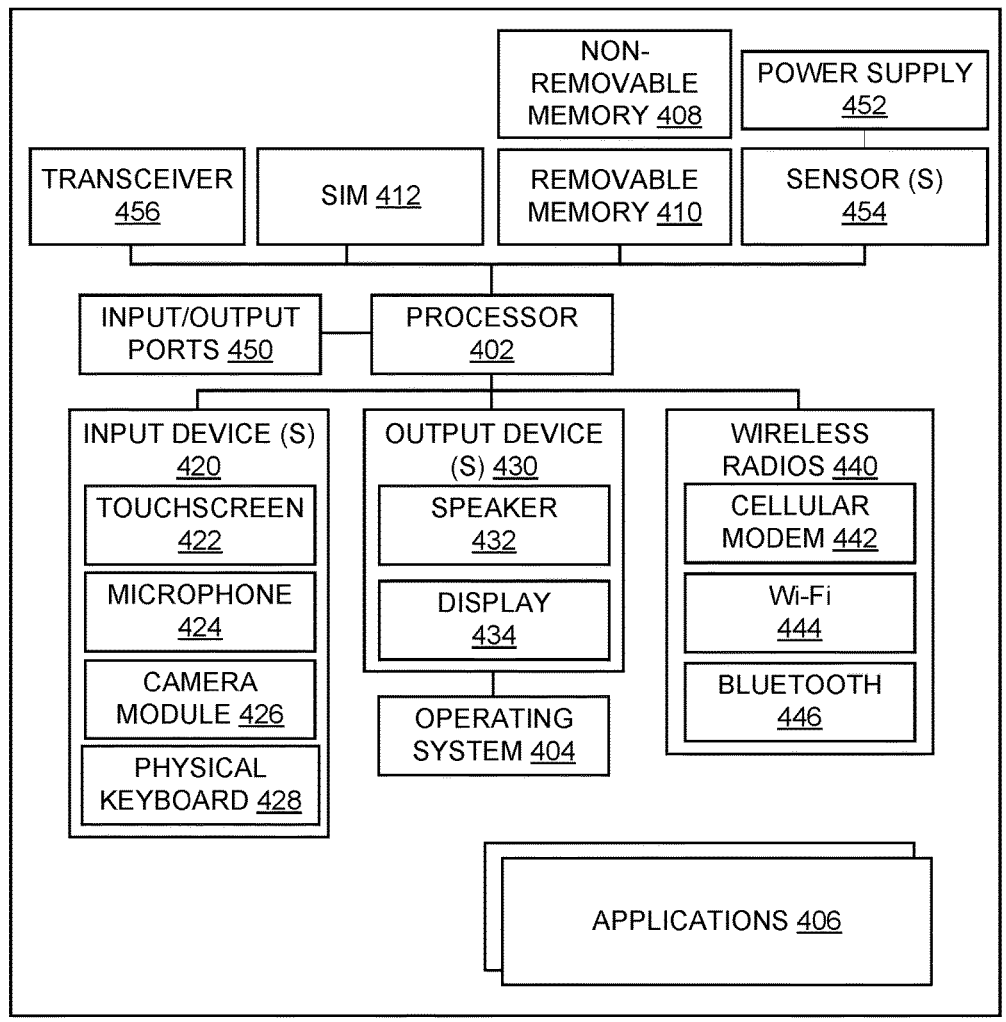
FIG. 4 illustrates an example block diagram of an electronic device capable of implementing example embodiments described herein.

FIG. 4 is a schematic block diagram of an electronic device 400 capable of implementing embodiments of the techniques described herein. It should be understood that the electronic device 400 as illustrated and hereinafter described is merely illustrative of one type of apparatus or an electronic device and should not be taken to limit the scope of the embodiments. As such, it should be appreciated that at least some of the components described below in connection with the electronic device 400 may be optional and thus in an example embodiment may include more, less or different components than those described in connection with the example embodiment of FIG. 4. As such, among other examples, the electronic device 400 could be any of apparatuses incorporating a digital camera module or a digital imaging system. For example, the electronic device 400 may be implemented as a stand-alone digital camera device, e.g. a compact camera, a single-lens reflex (SLR) camera, or a mirrorless interchangeable-lens camera, or the electronic device 400 may be implemented e.g. as a smartphone, a tablet computer, a wearable camera or a web camera.

The illustrated electronic device 400 includes a controller or a processor 402 (i.e. a signal processor, microprocessor, ASIC, or other control and processing logic circuitry) for performing such tasks as signal coding, data processing, input/output processing, power control, and/or other functions. An operating system 404 controls the allocation and usage of the components of the electronic device 400 and support for one or more application programs 406. The application programs 406 can include common mobile applications, for instance, telephony applications, email applications, calendars, contact managers, web browsers, messaging applications, or any other application.

The illustrated electronic device 400 includes one or more memory components, for example, a non-removable memory 408 and/or removable memory 410. The non-removable memory 408 may include RAM, ROM, flash memory, a hard disk, or other well-known memory storage technologies. The removable memory 410 may include flash memory or smart cards. The one or more memory components may be used for storing data and/or code for running the operating system 404 and the applications 406. Example of data may include web pages, text, images, sound files, image data, video data, or other data sets to be sent to and/or received from one or more network servers or other devices via one or more wired or wireless networks. The electronic device 400 may further include a subscriber identity module (SIM) 412. The SIM 412 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution). The SIM 412 may comprise a virtual SIM. Furthermore, multiple SIMs may be utilized.

The electronic device 400 can support one or more input devices 420 and one or more output devices 430. Examples of the input devices 420 may include, but are not limited to, a touchscreen 422 (i.e., capable of capturing finger tap inputs, finger gesture inputs, multi-finger tap inputs, multi-finger gesture inputs, or keystroke inputs from a virtual keyboard or keypad), a microphone 424 (i.e., capable of capturing voice input), a camera module 426 (i.e., capable of capturing still picture images and/or video images) and a physical keyboard 428. The camera module 426 may include the camera module 200 of FIG. 2. Examples of the output devices 430 may include, but are not limited to a speaker 432 and a display 434. Other possible output devices (not shown) can include piezoelectric or other haptic output devices. Some devices can serve more than one input/output function. For example, the touchscreen 422 and the display 434 can be combined into a single input/output device.

In an embodiment, the electronic device 400 may comprise a wireless radio(s) 440. The wireless radio(s) 440 can support two-way communications between the processor 402 and external devices, as is well understood in the art. The wireless radio(s) 440 are shown generically and can include, for example, a cellular modem 442 for communicating at long range with the mobile communication network, a Wi-Fi radio 444 for communicating at short range with a local wireless data network or router, and/or a BLUETOOTH radio 446. The cellular modem 442 is typically configured for communication with one or more cellular networks, such as a GSM/3G/4G network for data and voice communications within a single cellular network, between cellular networks, or between the mobile device and a public switched telephone network (PSTN).

The electronic device 400 can further include one or more input/output ports 450, a power supply 452, one or more sensors 454, for example an accelerometer, a gyroscope, a compass, or an infrared proximity sensor for detecting the orientation or motion of the electronic device 400, and a transceiver 456 (for wirelessly transmitting analog or digital signals). The illustrated components are not required or all-inclusive, as any of the components shown can be deleted and other components can be added.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing based devices it will be appreciated that the storage may be distributed or located remotely and accessed via a network or other communication link, for example by using a communication interface.

At least some of the examples disclosed in FIGS. 1-13 are able to provide output correction for digital image capture processing. At least some of the examples disclosed in FIGS. 1-13 are able to provide output correction for digital image capture processing that is adaptive in that the output correction adapts to the information content of captured digital image frames. At least some of the examples disclosed in FIGS. 1-13 are able to provide adaptive output correction for any illuminant dependent color correction function or illuminant dependent color space transformation function and the like. At least some of the examples disclosed in FIGS. 1-13 are able to provide adaptive output correction for an automatic white balance function, a lens shading correction function and/or a noise reduction function, and the like. At least some of the examples disclosed in FIGS. 1-13 are able to use information only from those frames that contain meaningful and relevant information for the automatic image capture processing function in question. When such frames do not exist, at least some of the examples disclosed in FIGS. 1-13 are able to combine information from multiple frames with different types of less meaningful and relevant information so that in average or as a summary the information is meaningful and relevant for the automatic image capture processing function in question. At least some of the examples disclosed in FIGS. 1-13 are able to sum the results from different frames to the final result with weighting so that the most optimal moments for the automatic image capture processing function in question are weighted more and the least optimal moments are not taken into account. At least some of the examples disclosed in FIGS. 1-13 are able to skip at least some portions of the output correction when the total weight is 0, thereby allowing saving power. At least some of the examples disclosed in FIGS. 1-13 are able to provide output correction for both still capture and video capture.

An embodiment of an apparatus comprises an access unit configured to access digital image frames captured by a digital camera, each of the digital image frames having an associated control value for a predetermined automatic image capture processing function; an information content change analysis unit configured to determine a measure of information content change for a current digital image frame of the accessed digital image frames relative to at least one previous digital image frame of the accessed digital image frames; an information content reliability analysis unit configured to determine a measure of information content reliability with respect to the predetermined automatic image capture processing function for the current digital image frame of the accessed digital image frames; a correction unit configured to correct the control value associated with the current digital image frame of the accessed digital image frames based on the determined measure of information content change and the determined measure of information content reliability; and an output unit configured to output a final control value for the predetermined automatic image capture processing function based on corrected control values for one or more digital image frames of the accessed digital image frames.

In an embodiment, alternatively or in addition to the above described embodiments, the information content change analysis unit is further configured to assign an information content change weight to the current digital image frame based on the determined measure of information content change for the current digital image frame such that the greater the determined measure of information content change is the greater the assigned information content change weight is.

In an embodiment, alternatively or in addition to the above described embodiments, the correction unit is configured to perform the correction of the control value associated with the current digital image frame based on the determined measure of information content change by applying the information content change weight assigned to the current digital image frame to the control value associated with the current digital image frame.

In an embodiment, alternatively or in addition to the above described embodiments, the information content reliability analysis unit is further configured to assign an information content reliability weight to the current digital image frame based on the determined measure of information content reliability for the current digital image frame such that the greater the determined measure of information content reliability is the greater the assigned information content reliability weight is.

In an embodiment, alternatively or in addition to the above described embodiments, the correction unit is configured to perform the correction of the control value associated with the current digital image frame based on the determined measure of information content reliability by applying the information content reliability weight assigned to the current digital image frame to the control value associated with the current digital image frame.

In an embodiment, alternatively or in addition to the above described embodiments, the information content change analysis unit is further configured to perform the determination of the measure of information content change for the current digital image frame by comparing the information content of the current digital image frame with the information content of the at least one previous digital image frame.

In an embodiment, alternatively or in addition to the above described embodiments, the information content change analysis unit is further configured to perform the determination of the measure of information content change for the current digital image frame based on detected motion of the digital camera.

In an embodiment, alternatively or in addition to the above described embodiments, the apparatus further comprises a history based weighting unit configured to assign a history based weight to the current digital image frame of the accessed digital image frames such that the current digital image frame of the accessed digital image frames is assigned a larger history based weight than all the previous digital image frames of the accessed digital image frames.

In an embodiment, alternatively or in addition to the above described embodiments, the correction unit is further configured to perform the correction of the control value associated with the current digital image frame by applying the history based weight assigned to the current digital image frame to the control value associated with the current digital image frame.

In an embodiment, alternatively or in addition to the above described embodiments, the output unit is configured to determine the final control value to be output by calculating a weighted average of the corrected control values for one or more digital image frames of the accessed digital image frames.

In an embodiment, alternatively or in addition to the above described embodiments, the measure of information content reliability indicates the likelihood of the correctness of the digital image frame associated control value with respect to the predetermined automatic image capture processing function.

In an embodiment, alternatively or in addition to the above described embodiments, the automatic image capture processing function comprises at least one of an illuminant dependent color correction function or an illuminant dependent color space transformation function.

In an embodiment, alternatively or in addition to the above described embodiments, the automatic image capture processing function comprises at least one of an automatic white balance function, a lens shading correction function or a noise reduction function.

An embodiment of a camera module comprises an image sensor configured to capture digital image frames; and an apparatus that comprises an access unit configured to access digital image frames captured by the image sensor, each of the digital image frames having an associated control value for a predetermined automatic image capture processing function; an information content change analysis unit configured to determine a measure of information content change for a current digital image frame of the accessed digital image frames relative to at least one previous digital image frame of the accessed digital image frames; an information content reliability analysis unit configured to determine a measure of information content reliability with respect to the predetermined automatic image capture processing function for the current digital image frame of the accessed digital image frames; a correction unit configured to correct the control value associated with the current digital image frame of the accessed digital image frames based on the determined measure of information content change and the determined measure of information content reliability; and an output unit configured to output a final control value for the predetermined automatic image capture processing function based on corrected control values for one or more digital image frames of the accessed digital image frames.

An embodiment of a method comprises accessing digital image frames captured by a digital camera, each of the digital image frames having an associated control value for a predetermined automatic image capture processing function; determining a measure of information content change for a current digital image frame of the accessed digital image frames relative to at least one previous digital image frame of the accessed digital image frames; determining a measure of information content reliability with respect to the predetermined automatic image capture processing function for the current digital image frame of the accessed digital image frames; correcting the control value associated with the current digital image frame of the accessed digital image frames based on the determined measure of information content change and the determined measure of information content reliability; and outputting a final control value for the predetermined automatic image capture processing function based on corrected control values for one or more digital image frames of the accessed digital image frames.

In an embodiment, alternatively or in addition to the above described embodiments, the method further comprises assigning an information content change weight to the current digital image frame based on the determined measure of information content change for the current digital image frame such that the greater the determined measure of information content change is the greater the assigned information content change weight is, wherein the correction of the control value associated with the current digital image frame based on the determined measure of information content change is performed by applying the information content change weight assigned to the current digital image frame to the control value associated with the current digital image frame.

In an embodiment, alternatively or in addition to the above described embodiments, the method further comprises assigning an information content reliability weight to the current digital image frame based on the determined measure of information content reliability for the current digital image frame such that the greater the determined measure of information content reliability is the greater the assigned information content reliability weight is, wherein the correction of the control value associated with the current digital image frame based on the determined measure of information content reliability is performed by applying the information content reliability weight assigned to the current digital image frame to the control value associated with the current digital image frame.

In an embodiment, alternatively or in addition to the above described embodiments, the method further comprises assigning a history based weight to the current digital image frame of the accessed digital image frames such that the current digital image frame of the accessed digital image frames is assigned a larger history based weight than all the previous digital image frames of the accessed digital image frames, wherein the correction of the control value associated with the current digital image frame is performed by applying the history based weight assigned to the current digital image frame to the control value associated with the current digital image frame.

In an embodiment, alternatively or in addition to the above described embodiments, the determination of the measure of information content change for the current digital image frame is performed based on any combination of the following: a comparison the information content of the current digital image frame with the information content of the at least one previous digital image frame, and detected motion of the digital camera.

In an embodiment, alternatively or in addition to the above described embodiments, the measure of information content reliability indicates the likelihood of the correctness of the digital image frame associated control value with respect to the predetermined automatic image capture processing function.

In an embodiment, alternatively or in addition to the above described embodiments, motion tracking is utilized (e.g. by the information content change analysis unit) to assist in the information content change based weighting.

In an embodiment, alternatively or in addition to the above described embodiments, re-construction of a scene comprising several different spatial locations is utilized.

The embodiments illustrated and described herein as well as embodiments not specifically described herein but within the scope of aspects of the disclosure constitute exemplary means for adaptive output correction for digital image capture processing. For example, the elements illustrated in FIG. 1 to FIG. 2 constitute exemplary means for accessing digital image frames captured by a digital camera, exemplary means for determining a measure of information content change for a current digital image frame of the accessed digital image frames relative to at least one previous digital image frame of the accessed digital image frames, exemplary means for determining a measure of information content reliability with respect to the predetermined automatic image capture processing function for the current digital image frame of the accessed digital image frames, exemplary means for correcting the control value associated with the current digital image frame of the accessed digital image frames based on the determined measure of information content change and the determined measure of information content reliability, and exemplary means for outputting a final control value for the predetermined automatic image capture processing function based on corrected control values for one or more digital image frames of the accessed digital image frames.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The processes described herein may be performed by software in machine readable form on a tangible storage medium e.g. in the form of a computer program comprising computer program code means adapted to perform all the steps of any of the processes described herein when the program is run on a computer and where the computer program may be embodied on a computer readable medium. Examples of tangible storage media include computer-readable media such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the blocks or elements identified, but that such blocks or elements do not comprise an exclusive list, and a system, a device or an apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus, comprising:
   an access unit configured to access digital image frames captured by a digital camera, each of the digital image frames having an associated control value for a predetermined automatic image capture processing function;
   an information content change analysis unit configured to determine a measure of information content change for a current digital image frame of the accessed digital image frames relative to at least one previous digital image frame of the accessed digital image frames;
   an information content reliability analysis unit configured to determine a measure of information content reliability with respect to the predetermined automatic image capture processing function for the current digital image frame of the accessed digital image frames;
   a correction unit configured to correct the control value associated with the current digital image frame of the accessed digital image frames based on the determined measure of information content change and the determined measure of information content reliability; and
   an output unit configured to output a final control value for the predetermined automatic image capture processing function based on corrected control values for one or more digital image frames of the accessed digital image frames.

2. The apparatus as claimed in claim 1, wherein the information content change analysis unit is further configured to assign an information content change weight to the current digital image frame based on the determined measure of information content change for the current digital image frame such that the greater the determined measure of information content change is the greater the assigned information content change weight is.

3. The apparatus as claimed in claim 2, wherein the correction unit is configured to perform the correction of the control value associated with the current digital image frame based on the determined measure of information content change by applying the information content change weight assigned to the current digital image frame to the control value associated with the current digital image frame.

4. The apparatus as claimed in claim 1, wherein the information content reliability analysis unit is further configured to assign an information content reliability weight to the current digital image frame based on the determined measure of information content reliability for the current digital image frame such that the greater the determined measure of information content reliability is the greater the assigned information content reliability weight is.

5. The apparatus as claimed in claim 4, wherein the correction unit is configured to perform the correction of the control value associated with the current digital image frame based on the determined measure of information content reliability by applying the information content reliability weight assigned to the current digital image frame to the control value associated with the current digital image frame.

6. The apparatus as claimed in claim 1, wherein the information content change analysis unit is further configured to perform the determination of the measure of information content change for the current digital image frame by comparing the information content of the current digital image frame with the information content of the at least one previous digital image frame.

7. The apparatus as claimed in claim 1, wherein the information content change analysis unit is further configured to perform the determination of the measure of information content change for the current digital image frame based on detected motion of the digital camera.

8. The apparatus as claimed in claim 1, further comprising a history based weighting unit configured to assign a history based weight to the current digital image frame of the accessed digital image frames such that the current digital image frame of the accessed digital image frames is assigned a larger history based weight than all the previous digital image frames of the accessed digital image frames.

9. The apparatus as claimed in claim 8, wherein the correction unit is further configured to perform the correction of the control value associated with the current digital image frame by applying the history based weight assigned to the current digital image frame to the control value associated with the current digital image frame.

10. The apparatus as claimed in claim 1, wherein the output unit is configured to determine the final control value to be output by calculating a weighted average of the corrected control values for one or more digital image frames of the accessed digital image frames.

11. The apparatus as claimed in claim 1, wherein the measure of information content reliability indicates the likelihood of the correctness of the digital image frame associated control value with respect to the predetermined automatic image capture processing function.

12. The apparatus as claimed in claim 1, wherein the automatic image capture processing function comprises at least one of an illuminant dependent color correction function or an illuminant dependent color space transformation function.

13. The apparatus as claimed in claim 1, wherein the automatic image capture processing function comprises at least one of an automatic white balance function, a lens shading correction function or a noise reduction function.

14. A camera module, comprising:
an image sensor configured to capture digital image frames; and
an apparatus, comprising:
an access unit configured to access digital image frames captured by the image sensor, each of the digital image frames having an associated control value for a predetermined automatic image capture processing function;
an information content change analysis unit configured to determine a measure of information content change for a current digital image frame of the accessed digital image frames relative to at least one previous digital image frame of the accessed digital image frames;
an information content reliability analysis unit configured to determine a measure of information content reliability with respect to the predetermined automatic image capture processing function for the current digital image frame of the accessed digital image frames;
a correction unit configured to correct the control value associated with the current digital image frame of the accessed digital image frames based on the determined measure of information content change and the determined measure of information content reliability; and
an output unit configured to output a final control value for the predetermined automatic image capture processing function based on corrected control values for one or more digital image frames of the accessed digital image frames.

15. A method, comprising:
accessing digital image frames captured by a digital camera, each of the digital image frames having an associated control value for a predetermined automatic image capture processing function;
determining a measure of information content change for a current digital image frame of the accessed digital image frames relative to at least one previous digital image frame of the accessed digital image frames;
determining a measure of information content reliability with respect to the predetermined automatic image capture processing function for the current digital image frame of the accessed digital image frames;
correcting the control value associated with the current digital image frame of the accessed digital image frames based on the determined measure of information content change and the determined measure of information content reliability; and
outputting a final control value for the predetermined automatic image capture processing function based on corrected control values for one or more digital image frames of the accessed digital image frames.

16. The method as claimed in claim 15, further comprising assigning an information content change weight to the current digital image frame based on the determined measure of information content change for the current digital image frame such that the greater the determined measure of information content change is the greater the assigned information content change weight is, wherein the correction of the control value associated with the current digital image frame based on the determined measure of information content change is performed by applying the information content change weight assigned to the current digital image frame to the control value associated with the current digital image frame.

17. The method as claimed in claim 15, further comprising assigning an information content reliability weight to the current digital image frame based on the determined measure of information content reliability for the current digital image frame such that the greater the determined measure of information content reliability is the greater the assigned information content reliability weight is, wherein the correction of the control value associated with the current digital image frame based on the determined measure of information content reliability is performed by applying the information content reliability weight assigned to the current digital image frame to the control value associated with the current digital image frame.

18. The method as claimed in claim 15, further comprising assigning a history based weight to the current digital image frame of the accessed digital image frames such that the current digital image frame of the accessed digital image frames is assigned a larger history based weight than all the previous digital image frames of the accessed digital image frames, wherein the correction of the control value associated with the current digital image frame is performed by applying the history based weight assigned to the current digital image frame to the control value associated with the current digital image frame.

19. The method as claimed in claim 15, wherein the determination of the measure of information content change for the current digital image frame is performed based on any combination of the following: a comparison the information content of the current digital image frame with the information content of the at least one previous digital image frame, and detected motion of the digital camera.

20. The method as claimed in claim 15, wherein the measure of information content reliability indicates the likelihood of the correctness of the digital image frame associated control value with respect to the predetermined automatic image capture processing function.

\* \* \* \* \*